US010480216B2

(12) United States Patent
Lim et al.

(10) Patent No.: US 10,480,216 B2
(45) Date of Patent: Nov. 19, 2019

(54) SMART SECURITY DEVICE AND SYSTEM

(71) Applicant: ASCENT SOLUTIONS PTE LTD, Singapore (SG)

(72) Inventors: Chee Kean Lim, Singapore (SG); Kia Boon Chew, Singapore (SG)

(73) Assignee: ASCENT SOLUTIONS PTE LTD, Singapore (SG)

( * ) Notice: Subject to any disclaimer, the term of this patent is extended or adjusted under 35 U.S.C. 154(b) by 0 days.

(21) Appl. No.: 15/774,945

(22) PCT Filed: Nov. 8, 2016

(86) PCT No.: PCT/SG2016/050553
§ 371 (c)(1),
(2) Date: May 9, 2018

(87) PCT Pub. No.: WO2017/082823
PCT Pub. Date: May 18, 2017

(65) Prior Publication Data
US 2018/0328079 A1    Nov. 15, 2018

Related U.S. Application Data

(63) Continuation-in-part of application No. PCT/SG2016/050225, filed on May 3, 2016, which is
(Continued)

(51) Int. Cl.
E05B 39/00    (2006.01)
E05B 67/00    (2006.01)
(Continued)

(52) U.S. Cl.
CPC .......... *E05B 39/005* (2013.01); *E05B 45/005* (2013.01); *E05B 47/0001* (2013.01);
(Continued)

(58) Field of Classification Search
CPC .... E05B 39/005; E05B 45/005; E05B 67/003; E05B 47/0001; G06Q 10/0833
See application file for complete search history.

(56) References Cited

U.S. PATENT DOCUMENTS 6,717,516 B2    4/2004  Bridgelall
8,611,321 B2   12/2013  Herrala et al.
(Continued)

FOREIGN PATENT DOCUMENTS

EP    2189964 A1    5/2010
GB    2508896 A     6/2014
(Continued)

OTHER PUBLICATIONS

Foreign Correspondence From a Related Counterpart Application, International Search Report and Written Opinion dated Feb. 2, 2017, International Application No. PCT/SG2016/050553 filed on Nov. 8, 2016.
(Continued)

*Primary Examiner* — Hongmin Fan

(57) ABSTRACT

A smart security device comprising: a housing, and electronics provided in the housing, the electronics comprising a tag uniquely associated with the smart security device and configured to automatically and periodically emit a first signal, the first signal being a Bluetooth signal configured to be sent and received via a Bluetooth low energy wireless personal area network; and a NB-IoT module configured to send and receive signals via a NB-IoT network.

17 Claims, 8 Drawing Sheets

Related U.S. Application Data a continuation-in-part of application No. PCT/SG2015/050439, filed on Nov. 9, 2015.

(51) Int. Cl.

| | | |
|---|---|---|
| *G06Q 10/08* | (2012.01) | |
| *E05B 45/00* | (2006.01) | |
| *G06Q 50/28* | (2012.01) | |
| *H04W 4/80* | (2018.01) | |
| *G01S 19/13* | (2010.01) | |
| *G06K 7/10* | (2006.01) | |
| *G06K 19/077* | (2006.01) | |
| *E05B 47/00* | (2006.01) | |
| *G07C 9/00* | (2006.01) | |

(52) U.S. Cl.
CPC ............ *E05B 67/003* (2013.01); *G01S 19/13* (2013.01); *G06K 7/10297* (2013.01); *G06K 19/07758* (2013.01); *G06Q 10/08* (2013.01); *G06Q 10/0833* (2013.01); *G06Q 50/28* (2013.01); *G07C 9/00309* (2013.01); *H04W 4/80* (2018.02); *E05B 2047/0095* (2013.01)

(56) References Cited

U.S. PATENT DOCUMENTS

| | | | |
|---|---|---|---|
| 2011/0273852 A1* | 11/2011 | Debrody | G09F 3/0317 361/747 |
| 2012/0239493 A1 | 9/2012 | Zughaib et al. | |
| 2014/0018001 A1 | 1/2014 | Nakra et al. | |
| 2014/0091931 A1 | 4/2014 | Cova et al. | |
| 2014/0109631 A1 | 4/2014 | Asquith et al. | |
| 2015/0002274 A1 | 1/2015 | Sengstaken, Jr. | |
| 2015/0020558 A1 | 1/2015 | Williams | |
| 2015/0046205 A1 | 2/2015 | Muirhead | |
| 2015/0154839 A1 | 6/2015 | Stoddard | |
| 2016/0042582 A1* | 2/2016 | Hyde | G07C 9/00944 70/53 |
| 2017/0135025 A1* | 5/2017 | Koskinen | H04W 24/02 |

FOREIGN PATENT DOCUMENTS

| | | |
|---|---|---|
| WO | 2015149107 A1 | 10/2015 |
| WO | 2017052816 A1 | 5/2017 |
| WO | 2017082812 A1 | 5/2017 |
| WO | 2017082823 A1 | 5/2017 |

OTHER PUBLICATIONS

Bontu, Chandra S. et al., "Wireless Wide-Area Networks for Internet of Things: An Air Interface Protocol for IoT and a Simultaneous Access Channel for Uplink IoT Communication", IEEE Vehicular Technology Magazine, IEEE, US, vol. 0, No. 1, Mar. 1, 2014.

Foreign Correspondence From a Related Counterpart Application, International Search Report and Written Opinion dated Dec. 21, 2015, International Application No. PCT/SG2015/050439 filed on Nov. 9, 2015.

Foreign Correspondence From a Related Counterpart Application, International Preliminary Report on Patentability dated May 6, 2016, International Application No. PCT/SG2015/050439 filed on Nov. 9, 2015.

Foreign Correspondence From a Related Counterpart Application, International Search Report and Written Opinion dated Jul. 8, 2016, International Application No. PCT/SG2016/050225 filed on May 13, 2016.

* cited by examiner

SMART SECURITY DEVICE AND SYSTEM

CROSS-REFERENCE TO RELATED APPLICATIONS

The present application is a filing under 35 U.S.C. 371 as the National Stage of International Application No. PCT/SG2016/050553, filed Nov. 8, 2016, entitled "SMART SECURITY DEVICE AND SYSTEM," which claims priority as a continuation-in-part of International Application No. PCT/SG2016/050225, filed May 13, 2016, which claims priority as a continuation-in-part of International Application No. PCT/SG2015/050439, filed Nov. 9, 2015, each of which are incorporated herein by reference in their entirety for all purposes.

FIELD OF THE INVENTION

This invention relates to a smart security device and system.

BACKGROUND OF THE INVENTION

In the security industry, many devices and systems exist for keeping assets safely secured while allowing only authorized persons access to unlock the secured assets for use or for transfer to another authorized party. In urban areas for example, water supply and mechanical and electrical services of buildings are normally kept locked to prevent malicious tampering, and only authorized persons are given access to them to perform maintenance work. In the transportation of cargo including bulk liquids and gases by tankers, securing and tracking of the transportation vehicle or vessel are performed to guard against theft or piracy. However, lapses and losses may still arise, for example, such as if the persons authorized to unlock or deliver the secured assets fail to carry out procedures to secure the asset after use or fail to safely deliver the secured asset, for whatever reason. In other applications, loss of network signals may lead to location tracking devices failing to provide location information of items or persons that have been tagged with existing security devices. There is thus still a need for a device and system that can address such lapses to achieve maximum security of assets and persons.

SUMMARY OF INVENTION

According to a first aspect, there is provided a smart security device comprising: a housing, and electronics provided in the housing, the electronics comprising a tag uniquely associated with the smart security device and configured to automatically and periodically emit a first signal, the first signal being a Bluetooth signal configured to be sent and received via a Bluetooth low energy wireless personal area network; and a NB-IoT module configured to send and receive signals via a NB-IoT network.

The electronics may further comprise a Global Positioning System (GPS) module for location tracking of the smart security device via GPS.

The smart security device may further comprise a cable having a free end and a secured end, the secured end being secured to the housing and in electrical connection with the electronics; and a lock assembly at least partially provided in the housing, the lock assembly comprising a body comprising a cable passage configured for passing the free end of the cable therethrough and for immobilizing the cable therein, a lever having a free end and a pivoting end, the pivoting end pivotably connected to the body, the lever having a resilient plate provided thereon, the resilient plate configured to exert a force on a cable immobilizer against the cable to immobilize the cable in the cable passage when a side of the lever facing the body is brought into contact with a side of the body facing the lever while the cable is in the cable passage, and a fastener configured to secure the lever to the body when the cable is immobilized in the cable passage.

The smart security device may further comprise a remotely actuated lock configured to be remotely activated to prevent physical unlocking of the smart security device and remotely deactivated to allow physical unlocking of the smart security device using the signals received by the NB-IoT module.

The fastener comprise a lock passage provided in the body and a lock pin provided on the lever, the lock passage configured to receive the lock pin therein, and wherein the remotely actuated lock comprises a securing pin configured to pass through the lever into a securing hole provided in the lock pin in an activated position, the securing pin configured to be withdrawn from the securing hole in a deactivated position.

The remotely actuated lock may further comprise a motorized actuator configured to move the securing pin between the activated position and the deactivated position, wherein operation of the motorized actuator is configured to be triggered by a signal received by the NB-IoT module.

The remotely actuated lock may be provided within the housing and externally invisible.

According to a second aspect, there is provided a smart security system comprising the smart security device of the first aspect; a receiving transmitter having a Bluetooth signal reception functionality, the receiving transmitter configured to automatically receive the first signal from the tag when the receiving transmitter is within a broadcast range of the tag without requiring pairing of the receiving transmitter and the tag, the receiving transmitter further configured to transmit a second signal; a data system configured to be remotely accessible to the receiving transmitter and to receive the second signal transmitted from the receiving transmitter, the data system comprising at least one server for executing tasks and a data store connected to the at least one server for data storage, the second signal being transmitted via a network to which the receiving transmitter is connected, the network being at least one of a cellular mobile network and a wireless network, the data system further configured to remotely communicate with the NB-IoT module via the NB-IoT network; and an application configured to be installed in the receiving transmitter, the application configured to allow the receiving transmitter to automatically receive the first signal and to initiate transmission of the second signal from the receiving transmitter to the data system.

The first signal may comprise information associated with the smart security device, and the second signal may comprise information associated with the receiving transmitter and at least part of the information associated with the smart security device.

The information associated with the receiving transmitter may include ownership and location information of the receiving transmitter, and the information associated with the smart security device may include information identifying the item to which the smart security device is attached and status of the smart security device.

Status of the smart security device may comprise at least one of: whether the smart security device is electronically locked and whether the smart security device is physically locked.

The smart security system may further comprise a plurality of the receiving transmitter provided at various locations, and the second signal transmitted from each of the plurality of the receiving transmitter may provide a record of movement of the item to which the smart security device is attached and a record of status of the smart security device, the movement being from an authorized sender to an authorized recipient through the various locations.

The second signal from one of the plurality of the receiving transmitter that is located at a location of the authorized recipient may include an electronic proof of delivery when the authorized recipient receives the item.

The application may be configured to initiate transmission of the second signal from the receiving transmitter to the data system via at least one of: automatic transmission and user-activated transmission.

The application may be configured to allow a user to select one of: automatic transmission and user-activated transmission to initiate transmission of the second signal from the receiving transmitter to the data system.

The smart security system may comprise comprising a plurality of the smart security device, the receiving transmitter being provided at a location where a number of items are stored, each of the number of items having one of the plurality of the smart security device attached thereto that is registered with the data system to indicate that the number of items are expected to be at the location, wherein the application installed in the receiving transmitter is configured to match received signals from each of the smart security devices at the location with expected presence of the registered smart security devices and to transmit an alert to the data system if a signal expected to be received from any one of the registered smart security devices is not received by the receiving transmitter within a specified time frame.

The data system may be configured to automatically activate or deactivate the remotely actuated lock when a predetermined condition is met.

The NB-IoT module may be configured to periodically transmit a signal to the data system to indicate its location.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Figure 1:
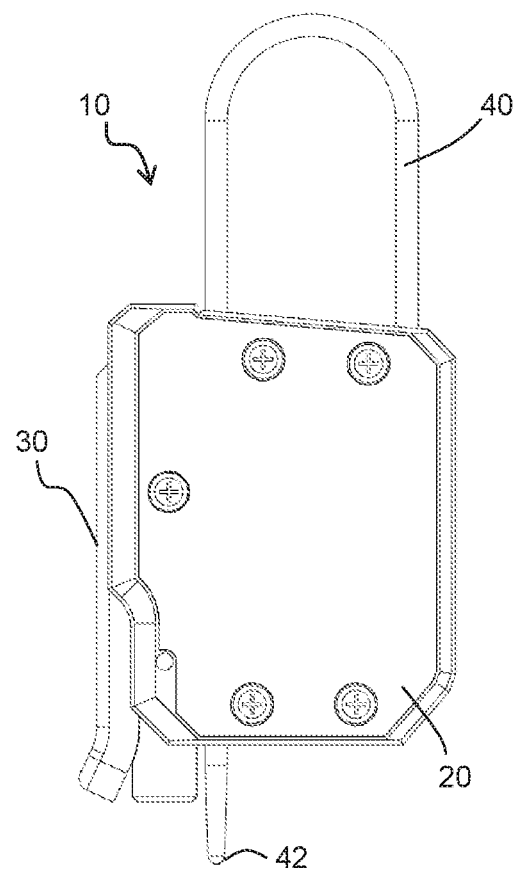
FIG. 1 is a front view of an exemplary smart security device.

Exemplary embodiments of the smart security device 10 and smart security system 1000 will be described below with reference to FIGS. 1 to 12 in which the same reference numerals denote the same or similar parts.

In the following description, the word "asset" is used to refer to anything that is to be monitored, whether intermittently, continually or continuously. Monitoring may be during movement of the asset or when it is stationary. The asset may include any mode of conveyance for transporting cargo to be monitored. For example, the smart security device 10 and system 1000 is suited for securely monitoring transit goods conveyed by road, sea, air and rail, including both containerized and non-containerized cargo, fuel trucks, bulk liquid tankers and motor vehicle units. The smart security device 10 and system 1000 is also applicable for goods to be transported to bonded warehouses, export goods, e-commerce packages, cash in transit, goods in transit (for example from port to container freight station and inland container terminal), transhipment goods, goods imported or exported under various governmental programs and so on. The assets may also comprise assets such as access doors, pieces of equipment or machinery that may be fixed or movable in facilities such as hospitals, factories, plants, military installations and so on.

The smart security device 10 of the present invention is configured to physically secure an asset. By "physically secure," it is meant that the smart security device 10 is physically attached to the asset. In some embodiments, "physically secure" may further include preventing access to the asset, in which access to the asset may include unlocking, opening or use of the asset, among other possibilities. Exemplary embodiments of the smart security device 10 that can perform such physical securing of the asset will be described below. It should be noted that the smart security device 10 is not limited to the described exemplary embodiments, and other appropriate physically securing means may be embodied by the smart security device 10.

Figure 3:
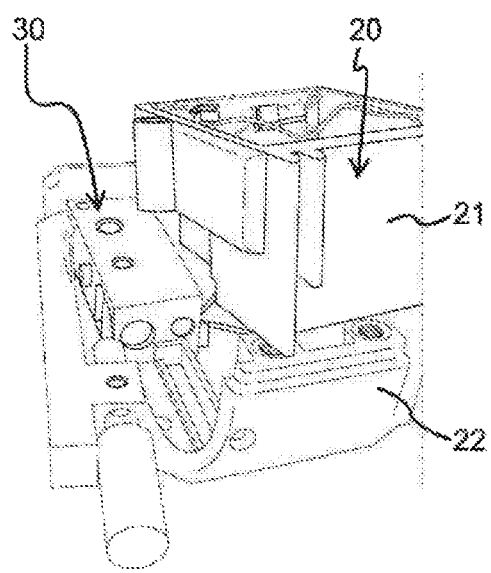
FIG. 3 is a perspective view of a prototype smart security device of FIG. 1 with an open housing to show a prototype lock assembly.

In a first exemplary embodiment, as shown in FIG. 1, the smart security device 10 comprises a housing 20 having a lock assembly 30 and containing electronics (not shown). The housing 20 preferably comprises a front portion 21 and a back portion 22, as shown in FIG. 3. The housing 20 is preferably made of a plastics or other suitable light weight material while the lock assembly 30 is preferably made of metal. The lock assembly 30 is configured to be in electrical connection with the electronics in the housing 20 when the lock assembly 30 is activated.

The smart security device 10 may also comprise a cable 40 having a secured end 41 and a free end 42. The secured end 41 of the cable is configured to be in electrical connection with the electronics, while the free end 42 is configured to be passed around a part of the asset to attach the security device 10 to the asset, for example, the locking bars of a container. The free end 42 of the cable 40 is further configured to be passed through the lock assembly 30 to secure and activate the smart security device 10, as will be described in greater detail below.

Figure 2:
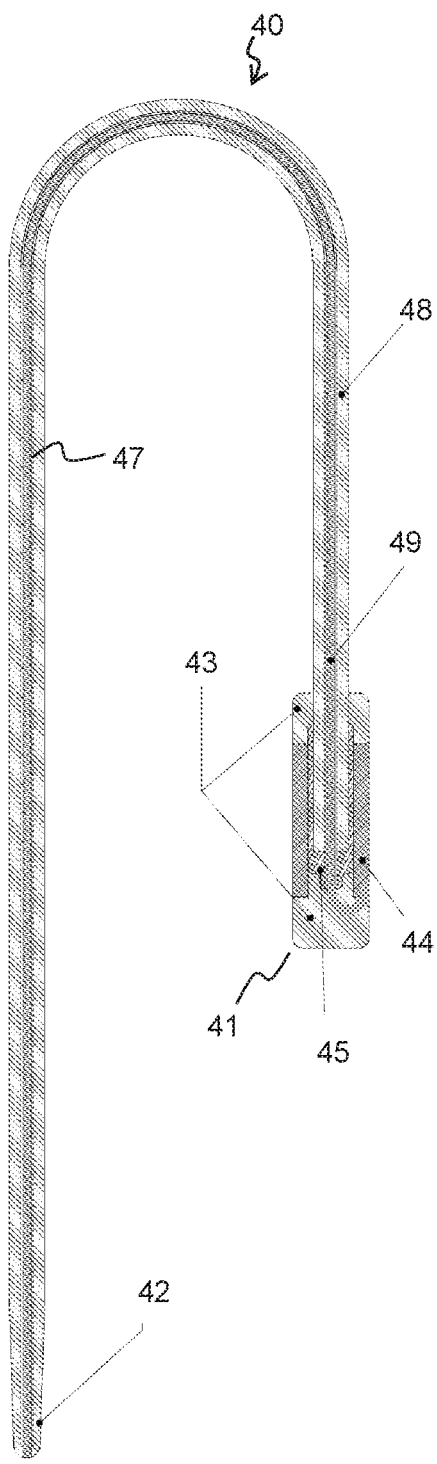
FIG. 2 is a schematic illustration of an exemplary cable of the smart security device of FIG. 1.

The cable 40 as shown in FIG. 2 preferably comprises an inner conducting core 49, a layer of insulation 47 disposed around the inner conducting core 49, and an external conductive layer 48 disposed outside and around the layer of insulation 47 along the length of the cable 40. The inner conducting core 49 and the layer of insulation 47 may be provided together as a shielded conducting cable. The external conductive layer 48 is preferably of stainless steel and may be provided as a stainless steel cable, but may be any other suitable material able to effect electrical connection and withstand wetting without significant corrosion. The external conductive layer 48 is configured to be in electrical connection with the inner conducting core 49 only at the free end 42 of the cable 40. This may be achieved by welding the inner conducting core 49 to the external conductive layer 48 at the free end 42.

The secured end 41 is provided with a conducting surround 44 such as a copper sleeve 44 that is in electrical connection with the inner conducting core 49. The conducting surround 44 is insulated from the external conductive layer 48 via an insulation tubing 45. The conducting surround 44 may further be provided with insulating plastic end caps 43. The secured end 41 is configured to be secured within the housing 20 so that the conducting surround 44 is in constant electrical connection with the electronics of the smart security device 10.

Figure 4A:
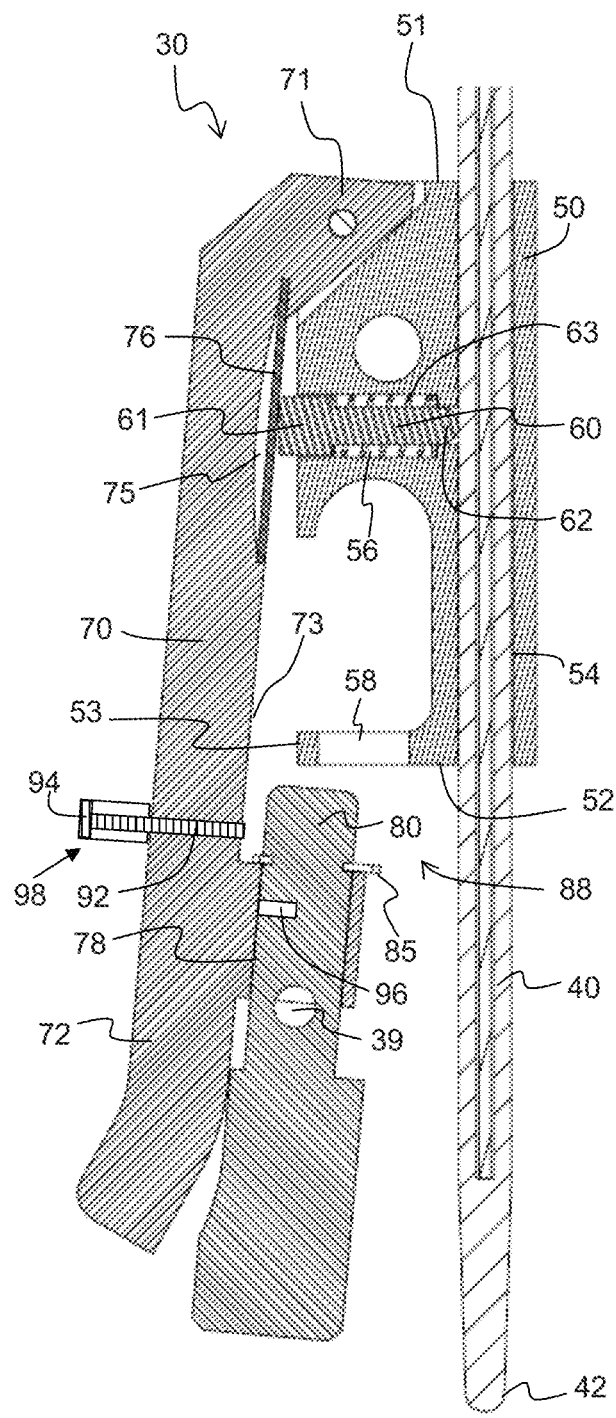
FIG. 4A is a front section view of a first embodiment of a remotely lockable lock assembly in an unlocked position.
Figure 4B:
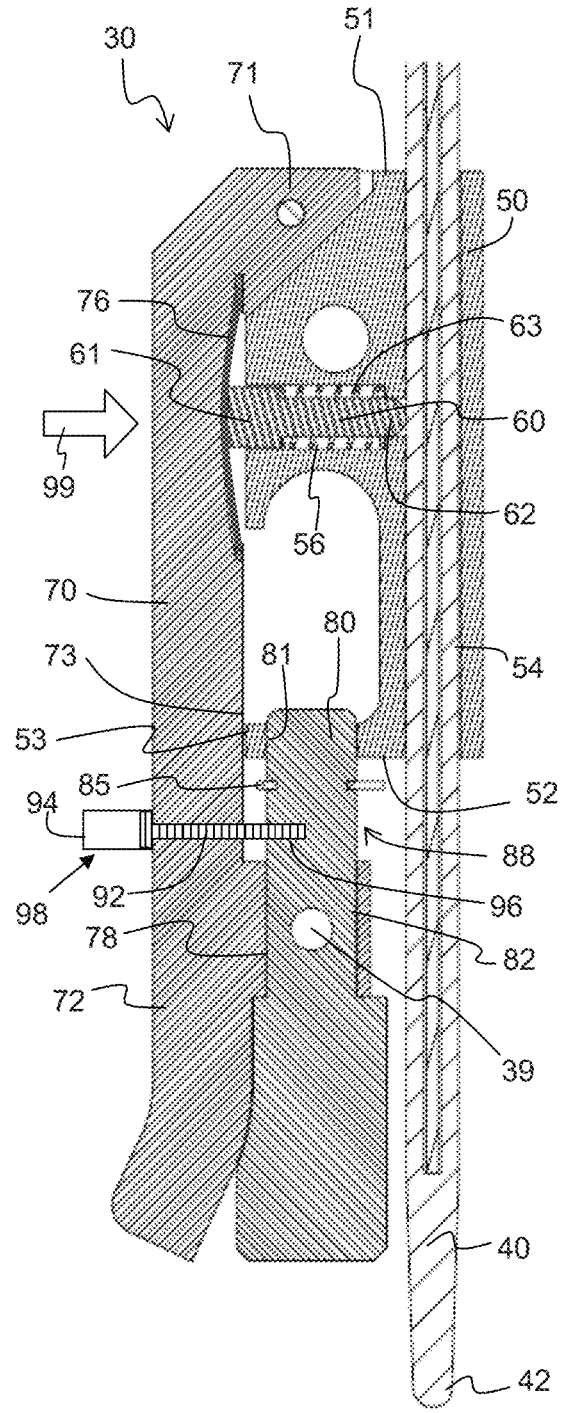
FIG. 4B is a front section view of the lock assembly of FIG. 4B in a locked position.
Figure 5:
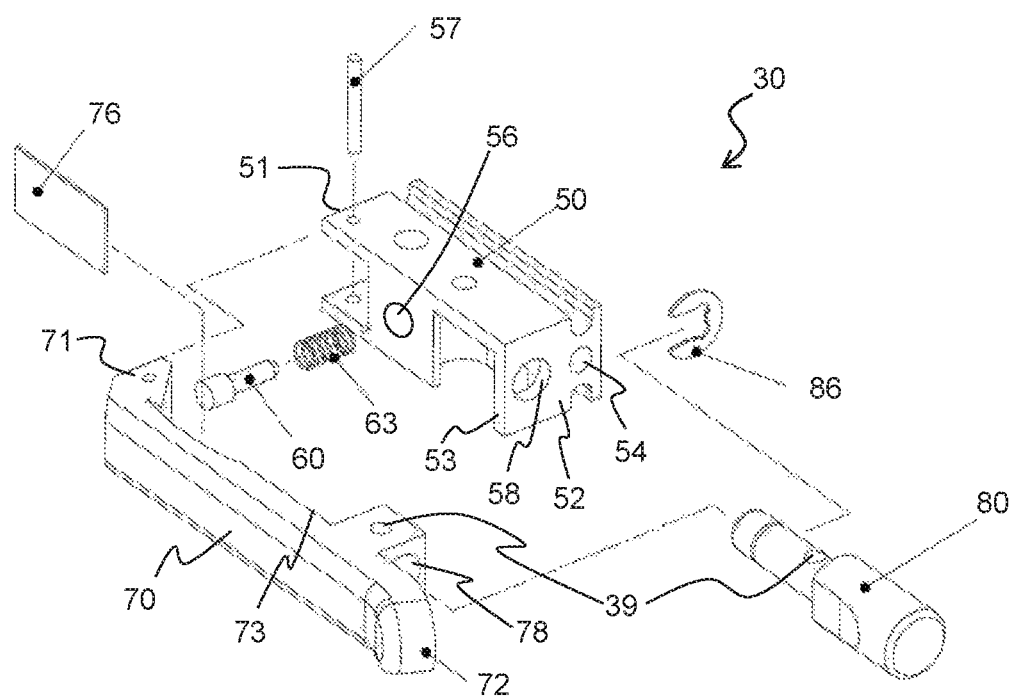
FIG. 5 is an exploded assembly view of the lock assembly of FIG. 1.
Figure 6:
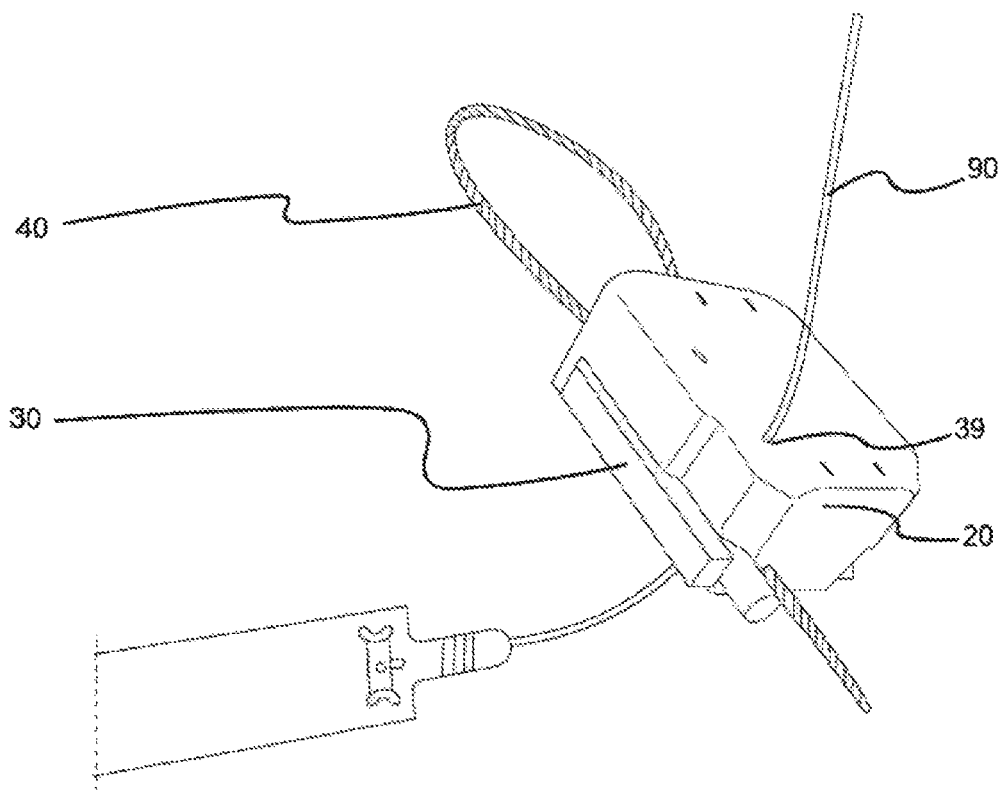
FIG. 6 is a perspective view of a prototype smart security device passed through with a cable tie.

As can be seen in FIGS. 1 and 3, the lock assembly 30 is provided at a side of the housing 20. The lock assembly 30 comprises a body 50 having a first end 51 and second end 52, as shown in FIGS. 4A, 4B and 5. The body 50 is preferably partially encased within the housing 20. A cable passage 54 in the form of a through hole is provided in the body 50. The cable passage 54 extends from the first end 51 to the second end 52 of the body 50. The cable passage 54 is configured to receive the cable 40 therein. Openings provided in the housing 20 are aligned with the cable passage 54 of the body 50 to allow the second end of the 42 of the cable 40 to enter the housing 20 and the cable passage 54 at the first end 51 of the body 50 and to exit the cable passage 54 and the housing 20 at the second end 52 of the body 50.

The lock assembly 30 further comprises a lever 70. A pivoting end 71 of the lever 70 is pivotably connected to the first end 51 of the body 50, for example via a hinge pin 57. A free end 72 of the lever is pivotable away from the body 50 and the housing 20, and is configured to be secured to the second end 52 of the body 50. A side 73 of the lever 70 facing the body 50 (referred to as the inner side 73 of the lever 70) between the pivoting end 71 and the free end 72 is configured to be brought into contact with a side 53 of the body 50 facing the lever 70 (referred to as the outer side 53 of the body 50) in order to immobilize the cable 40 relative to the body 50 when the cable 40 is in the cable passage 54.

A resilient plate 76 is provided at a portion of the inner side 73 of the lever 70. The resilient plate 76 preferably comprises a relatively stiff but still bendable resilient plate. A space 75 may be provided in the inner side 73 of the lever 70 under the resilient plate 76 to allow elastic deformation or bending of the resilient plate 76 into the lever 70. The resilient plate 76 is positioned on the lever 70 to exert a force 99 on a cable immobilizer 60 against the cable 40 to immobilize the cable 40 in the cable passage 54 when the inner side 73 of the lever 70 is brought into contact with the outer side 53 of the body 50.

As shown in FIGS. 4A and 4B, the cable immobilizer 60 is provided in the form of a pin and may be held in a pin passage 56 provided in the body 50. The pin passage 56 may comprise a through hole extending from the outer side 53 of the body 50 into the cable passage 54. The pin passage 56 is configured to receive the cable immobilizer 60 in the form of a pin therein. The cable immobilizer 60 is configured to move along the pin passage 56. The cable immobilizer 60 is longer than the pin passage 56. When a first end 61 of the cable immobilizer 60 is pushed into the pin passage 56 from the outer side 53 of the body 50, a second end 62 of the cable immobilizer 60 will extend out of the pin passage 56 into the cable passage 54 if there is no cable 40 in the pin passage 56. A biasing element 63 may be provided within the pin passage 56 to bias the cable immobilizer 60 away from the cable passage 54. The biasing element 63 preferably comprises a compression spring 63 provide around a shaft of the cable immobilizer 60 in the pin passage 56. The first end 61 of the cable immobilizer 60 may be enlarged in order to provide a rim for engaging a first end the biasing element 63. The pin passage 56 may have a reduced diameter where the pin passage 56 joins the cable passage 54. The reduced diameter of the pin passage 56 acts as a stop for engaging a second end of the biasing element 63. The reduced diameter of the pin passage 56 still allows passage of the second end 62 of the cable immobilizer 60 to pass from the pin passage 56 into the cable passage 54.

When the inner side 73 of the lever 70 is brought into contact with the outer side 53 of the body 50, as shown in FIG. 4B, the resilient plate 76 contacts and exerts a force 99 on the first end 61 of the cable immobilizer 60, against the biasing element 63, thereby tending to extend the second end 62 of the cable immobilizer 60 into the cable passage 54. If the cable 40 is in the cable passage 54 at this time, the second end 62 of the cable immobilizer 60 contacts and presses the cable 40 against the cable passage 54, while the resilient plate 76 exerts a force on the first end 61 of the cable immobilizer 60. Reaction of the first end 61 of the cable immobilizer 60 against the resilient plate 76 displaces the resilient plate 76 into the space 75 because the cable immobilizer 60 is longer than the pin passage 56. In FIG. 4B, the deformation of the resilient plate 76 is shown exaggerated for better understanding of the working principle.

Thus, when the inner side 73 of the lever 70 is brought into contact with the outer side 53 of the body 50, the cable 40 is immobilized against the cable passage 54 as a result of the resilient plate 76 pushing against the cable immobilizer 60 which in turn presses against the cable 40 in the cable passage 54, as shown in FIG. 4B. In this way, the second end 42 of the cable 40 cannot be withdrawn from the housing 20, and the cable 40 and the housing 20 thus form a continuous closed loop.

Notably, an external force indicated by arrow 99 is required to bring the inner side 73 of the lever 70 into contact with the outer side 53 of the body 50 when the cable 40 is in the cable passage 54. Because the cable immobilizer 60 is longer than the pin passage 56, as the lever 70 is brought closer to the body 50, the first end 61 of the cable immobilizer 60 comes into contact with the resilient plate 76 before the inner side 73 of the lever 70 comes into contact with the outer side 53 of the body 50. In order for the inner side 73 of the lever 70 to come into contact with the outer side 53 of the body 50, the resilient plate 76 must elastically deform into the space 75 in order to accommodate the length of the cable immobilizer 60 between the cable 40 and the resilient plate 76. Thus, when the cable 40 is in the cable passage 54, an external force 99 is required to elastically deform the resilient plate 76 against the cable immobilizer 60 in order to immobilize the cable 40 in the cable passage 54.

When the external force 99 is withdrawn without securing the lever 70 to the body 50, the resilient plate 60 ceases to be elastically deformed in the absence of the external force 99 and the inner side 73 of the lever 70 is no longer in contact with the outer side 53 of the body 50 even if the resilient plate 60 continues to rest against the first end 61 of the cable immobilizer 60, as shown in FIG. 4A.

In order to keep the resilient plate 76 pushing against the cable immobilizer 60 to immobilize the cable 40 in the cable passage 54 without having to apply an external force, as shown in FIG. 4B, a fastener 88 is provided to secure the lever 70 to the body 50 after the inner side 73 of the lever 70 has been brought into contact with the outer side 53 of the body 50 to depress the resilient plate 76 against the cable immobilizer 60. To that end, the fastener 88 may comprise a lock passage 58 provided in the body and a lock pin 80 provided on the lever 70. The lock passage 58 is in the form of a hole 58 is provided in the second end 52 of the body 50. The lock passage 58 is preferably laterally displaced from the cable passage 54. The lock pin 80 is provided at the second end 72 of the lever 70 and configured to be inserted into the lock passage 58 to secure the lever 70 to the body 50 when the inner side 73 of the lever 70 has been brought into contact with the outer side 53 of the body 50 to elastically deform the resilient plate 76 against the cable immobilizer 60.

The fastener 88 may further comprise a lock pin retainer 78 provided in the second end 72 of the lever 70 for slidably engaging the lock pin 80 to the lever 70. The lock pin retainer 78 may comprise a through hole 78 provided at the second end 72 of the lever. Preferably, the lock pin 80 is configured to be constantly held within the lock pin retainer 78 so as not to be misplaced. To that end, a securing clip 85 may be provided around the lock pin 80 to prevent withdrawal of the lock pin 80 from the lock pin retainer 78 in the lever 70.

Advantageously, when the lock pin 80 is in the lock passage 58 and the external force is removed, resilience of the resilient plate 60 biases the lever 70 away from the body 50 to slightly displace the inner side 73 of the lever 70 away from the outer side 53 of the body 50. This displacement causes a first side 81 of the lock pin 80 to be pressed against a side of the lock passage 58 while a second side 823 of the lock pin 80 is pressed against a side of the lock pin retainer 78, thereby securing the lock pin 80 between the lever 70 and the body 50.

In order to secure an asset with the smart security device 10, the free end 42 of the cable 40 is first passed through a secure portion of the asset into the cable passage 54. An external force 99 is then applied to the lever 70 to bring the inner side 73 of the lever into contact with the outer side 53 of the body 50, thereby elastically deforming the resilient plate 76 against the cable immobilizer 60 to press the cable immobilizer 60 against the cable 40 in the cable passage 54. Keeping the external force 99 applied, the lock pin 80 that is passed through the lock pin retainer 78 of the lever 70 is inserted into the lock passage 58 of the body 50. The external force 99 may then be released since the lock pin 80 that is secured between the lever 70 and the body 50 keeps the lever 70 close enough to the body 50 in order for the resilient plate 76 to continue pushing against the cable immobilizer 60 to immobilize the cable 40 in the cable passage 54. The cable 40 and the housing 20 thus form a physical closed continuous loop around the asset and the smart security device 10 is in a physically locked state.

To remove the smart security device 10 from the asset, the cable 40 must be withdrawn from the cable passage 54 so that the cable 40 and the housing 20 no longer form a closed physical loop. To that end, the lock pin 80 needs to be removed from the lock passage 58 in order to move the lever 70 away from the body 50 to release pressure of the resilient plate 76 against the cable immobilizer 60. Accordingly, an external force 99 must be applied to sufficiently elastically deform the resilient plate 76 against the cable immobilizer 60 in order to bring the lever 70 towards the body 50 and thereby remove pressure between the sides 81, 82 of lock pin 80 and the lock passage 58 and the lock pin retainer 78, to allow the lock pin 80 to be withdrawn from the lock passage 58.

For added visual confirmation that the smart security device 10 is in a physically locked state, a cable tie hole 39 may be provided through each of the housing 20, the lever 70 and the lock pin 80 when the lock pin 80 is in the lock passage 58 to allow a cable tie 90 to pass through the housing 20, the lever 70 and the lock pin 80 simultaneously. By securing the housing 20, the lever 70 and the lock pin 80 with a single cable tie 90, as shown in FIG. 5, wherein the lock pin 80 cannot be removed withdrawn from the lock passage 58 without cutting the cable tie 90, users are able to quickly visually determine that the smart security device 10 is in a physically locked state.

In addition to the smart security device 10 being configured to physically secure an asset, the smart security device 10 is preferably (although not necessarily) also configured to establish an electronic lock when activated by an authorized user.

To establish an electronic lock, in the first exemplary embodiment, whenever the cable 40 is immobilized in the cable passage 54, the external conductive layer 48 of the cable 40 in the cable passage 54 is configured to be in electrical connection with the electronics in the housing 20. In this way, the electronics, the secured end 41 of the cable 40 via the conducting surround 44, and the external conducting layer 48 of the cable 40 in the cable passage 54 form a closed electrical loop so that the smart security device 10 is electrically ready whenever the cable 40 is immobilized in the cable passage 54.

Electrical contacts (not shown) in electrical connection with the electronics are preferably also provided in the lock passage 58 to close a lock circuit upon contact with the lock pin 80 when the lock pin 80 is in the lock passage 58. Closure of the lock circuit is communicated to the electronics so that physical locking or unlocking of the smart security device 10 with the lock pin 80 can be recorded and kept track of.

The electronics of the smart security device 10 includes a low-cost active RFID beaconing tag 120. The tag 120 is configured to automatically continually and periodically emit a Bluetooth low energy (BLE) signal, i.e., a signal in the Industrial, Scientific and Medical (ISM) 2.4 GHz shortrange radio frequency band that is sent and received via a Bluetooth low energy wireless personal area network (BLE). The tag 120 has a long battery life, for example from five to seven years, without requiring recharge or battery change. The tag 120 is preferably powered by a small lithium-ion battery. Information transmitted with the emitted signal comprises a unique identification number of the smart security device 10, and may further comprise any other electronically stored information as may be desired, such as date and time of each activation and deactivation of the smart security device 10. The tag 120 typically has a broadcast range for its emitted signals comprising a radius ranging from 10 m to 30 m.

Optionally and preferably, the tag 120 is configured to automatically switch off when in flight mode, so that when affixed to an asset that will be transported by an aircraft at some point in time, the tag 120 on the asset in the aircraft will not interfere with the navigation or communication system of the aircraft. In the preferred embodiment, the tag 120 is sufficiently low in cost, as to be commercially feasible for only one-time or disposable use. The tag 120 is preferably provided in the housing 20 in the first exemplary embodiment of the smart security device 10.

Figure 7:
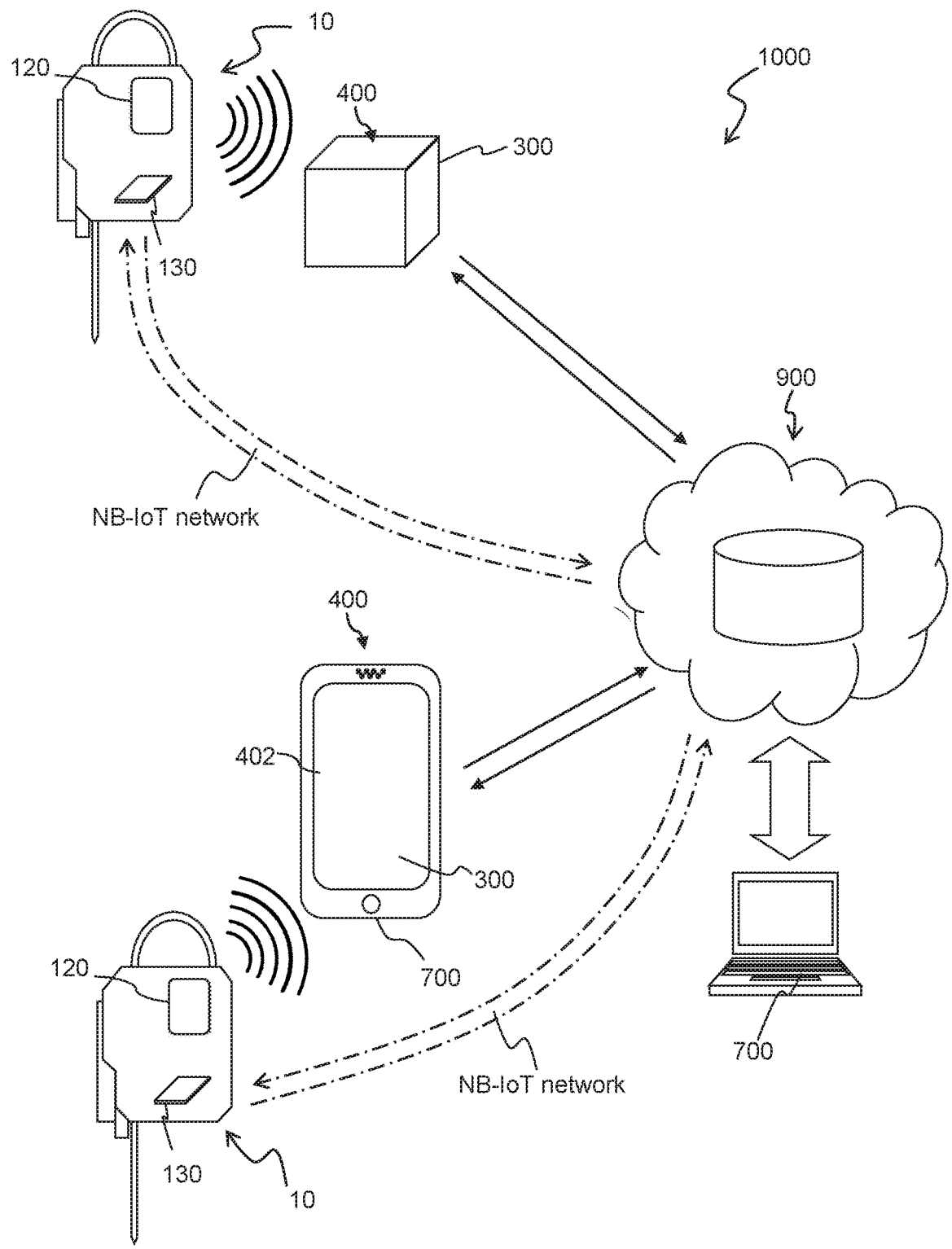
FIG. 7 is a schematic illustration of a first embodiment of a smart security system utilizing a number of the smart security devices of FIGS. 4A and 4B for location and security tracking and remote locking.

A smart security system 1000 utilizing one or more sets of the smart security device 10 includes one or more receiving transmitters 400 installed with an application 300 configured for location and status tracking of the smart security device 10, as shown in FIG. 7. The Bluetooth signals emitted by the tag 120 are configured to be received by the receiving transmitters 400. Each receiving transmitter 400 may take one of various forms including but not limited to a stationary device, a smartphone, a tablet, a handheld device, a wearable computing device, a wireless handset, a pager, a personal digital assistant (PDA), a gaming device, a media player, a headset computer, a wireless router or the like. Each receiving transmitter 400 may include a display 402 and a touch-sensitive surface and/or keys for input by a user. Where the receiving transmitter 400 comprises a smart touch-screen mobile phone, it will be understood that the display 402 and touch-sensitive surface are one and the same.

The receiving transmitter 400 may present options for the user to select, controls for the user to actuate, and/or cursors or other indicators for the user to direct. The receiving transmitter 400 may further accept data entry from the user, including numbers to dial or various parameter values for configuring the operation of the handset. The receiving transmitter 400 may further execute one or more software or firmware applications in response to user commands. These applications may configure the receiving transmitter 400 to perform various customized functions in response to user interaction. Additionally, the receiving transmitter 400 may be programmed and/or configured over-the-air, for example from a wireless base station, a wireless access point, or a peer receiving transmitter 400. The receiving transmitter 400 may execute a web browser application which enables the display 402 to show a web page. The web page may be obtained via wireless communications with a base transceiver station, a wireless network access node, a peer receiving transmitter 400 or any other wireless communication network or system.

The application 300 installed in each receiving transmitter 400 is configured for managing information obtained from a signal received from a tag 120. For example, the application 300 may be configured to associate the unique identification number of a smart security device 10 in a signal received from the tag 120 with the receiving transmitter's 400 own present location and identity. In a preferred embodiment, the application 300 is configured to be downloadable from a digital distribution platform (e.g. App Store™ or Google Play™) for installation in each receiving transmitter 400 via Internet connectivity of the receiving transmitter 400.

Figure 8:
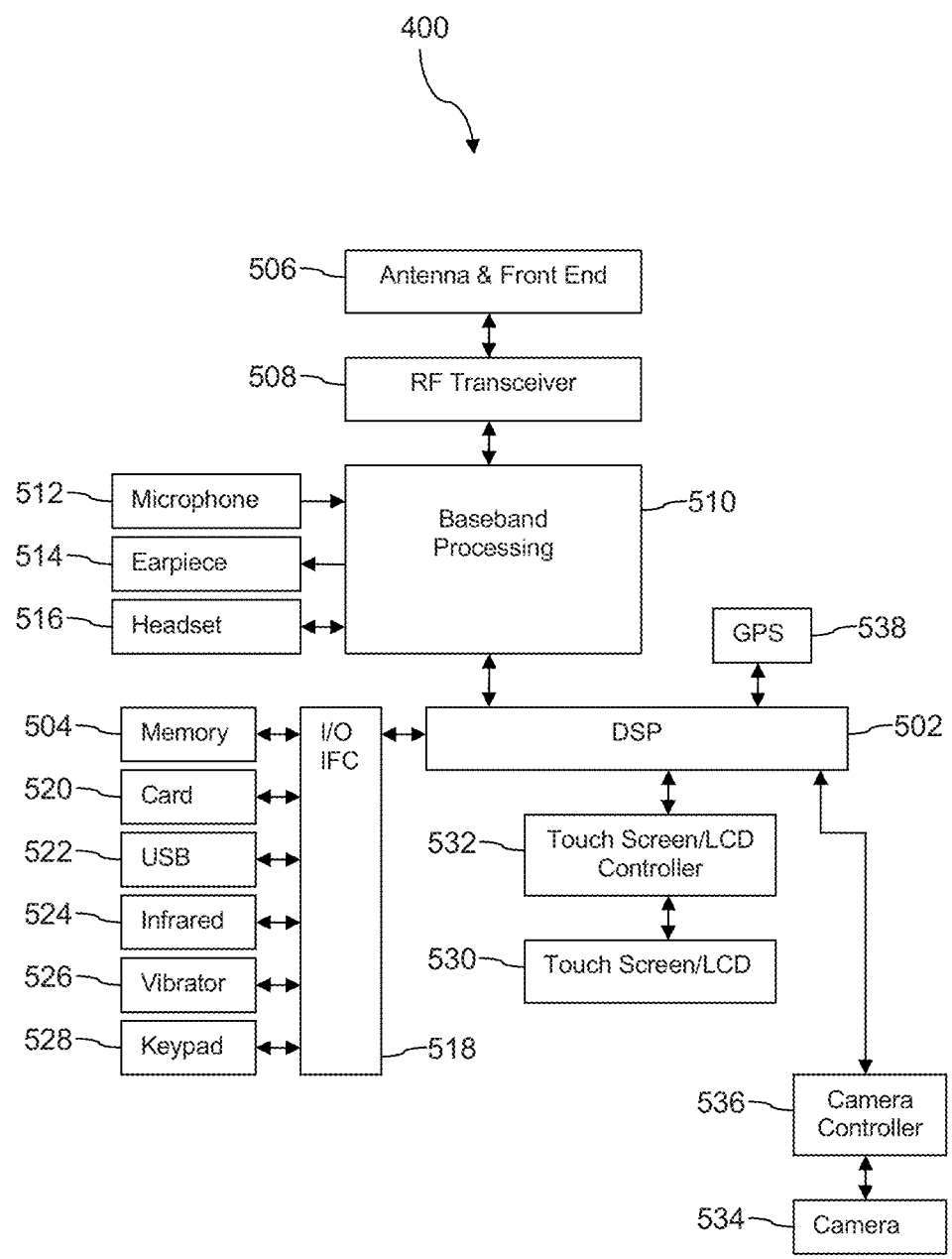
FIG. 8 is a block diagram of a receiving transmitter for installing an application for locating tracking of the smart security device.

FIG. 8 shows a block diagram of the receiving transmitter 400 configured as a mobile phone. In this embodiment, the application 300 would comprise a mobile application 300 configured to be downloadable and installable in the mobile phone receiving transmitter 400. While a variety of known components of handsets are depicted, in an embodiment a subset of the listed components and/or additional components not listed may be included in the receiving transmitter 400. In an embodiment, the receiving transmitter 400 includes a digital signal processor (DSP) 502 and a memory 504, as well as radio frequency (RF) transceiver 508 configured to receive signals from the active tag 120.

As shown, the receiving transmitter 400 may further include an antenna and front end unit 506, a baseband processing unit 510, a microphone 512, an earpiece and/or speaker 514, a headset port 516, an input/output interface 518, a removable memory card 520, a universal serial bus (USB) port 522, an infrared port 524, a vibrator 526, a keypad 528, a touch screen with a touch sensitive surface 530, a touch screen controller 532, a camera 534, a camera controller 536, a global positioning system (GPS) module 538, an accelerometer (e.g., a single or multi axis accelerometer), a gyroscope, and the like. In an embodiment, the receiving transmitter 400 may include another kind of display that does not provide a touch sensitive screen. In an embodiment, the DSP 502 may communicate directly with the memory 504 without passing through the input/output interface 518. Additionally, in an embodiment, the receiving transmitter 400 may comprise other peripheral devices that provide other functionality.

The DSP 502 or some other form of controller or central processing unit operates to control the various components of the receiving transmitter 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the receiving transmitter 400 to function as a peripheral device to exchange information with a personal computer or other computer system. The infrared port 524 and other optional ports such as a Bluetooth interface or an IEEE 802.11 compliant wireless interface enable the receiving transmitter 400 to communicate wirelessly with other nearby handsets and/or wireless base stations as well as the active tag 120. In an embodiment, the device 410 may comprise a near field communication (NFC) transceiver. The NFC transceiver may be used to complete payment transactions with point-of-sale terminals or other communications exchanges. In an embodiment, the device 40 may comprise a radio frequency identity (RFID) reader and/or writer device.

The RF transceiver 508 may also be referred to as a radio transceiver, or more concisely, as a radio. While one RF transceiver 508 is illustrated, the receiving transmitter 400 may comprise a plurality of radio transceivers, for example, different RF transceivers 508 associated with different wireless communication protocols and/or different frequency bands. Alternatively, the RF transceiver 508 may be a multi-protocol and/or multi-band RF transceiver.

The keypad 528 couples to the DSP 502 via the input/output interface 518 to provide one mechanism for the user to make selections, enter information, and otherwise provide input to the receiving transmitter 400. Another input mechanism may be the touch screen 530, which may also display text and/or graphics to the user. The touch screen controller 532 couples the DSP 502 to the touch screen 530. The GPS module 538 is coupled to the DSP 502 to decode global positioning system signals, thereby enabling the receiving transmitter 400 to determine its position.

Figure 9:
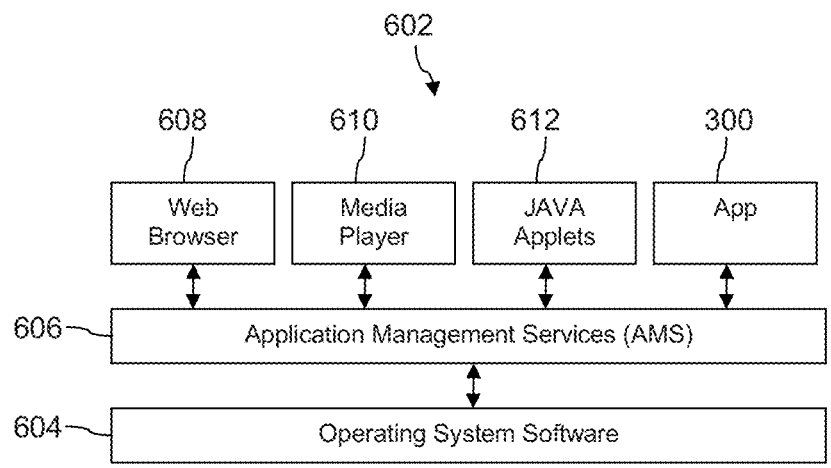
FIG. 9 is an illustration of a software environment that may be implemented by a digital signal processor of the receiving transmitter of FIG. 6.

FIG. 9 illustrates a software environment 602 that may be implemented by the DSP 502. The DSP 502 executes operating system software 604 that provides a platform from which the rest of the software operates. The operating system software 604 may provide a variety of drivers for the handset hardware using interfaces that are accessible to application software. The operating system software 604 may be coupled to and interact with application management services (AMS) 606 that transfer control between applications running on the receiving transmitter 400. Also shown in FIG. 6A are a web browser application 608, a media player application 610, and JAVA applets 612. The web browser application 608 may be executed by the receiving transmitter 400 to browse content and/or the Internet, for example when the receiving transmitter 400 is coupled to a network via a wireless link. The web browser application 608 may permit a user to enter information into forms and select links to retrieve and view web pages. The media player application 610 may be executed by the receiving transmitter 400 to play audio or audiovisual media. The JAVA applets 612 may be executed by the receiving transmitter 400 to provide a variety of functionality including games, utilities, and other functionality.

Figure 10:
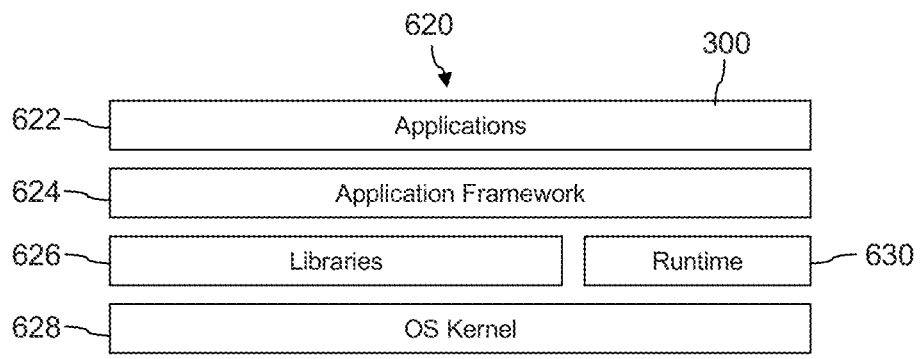
FIG. 10 is an illustration of an alternative software environment that may be implemented by a digital signal processor of the receiving transmitter of FIG. 6.

FIG. 10 illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

As the tag 120 continually emits a signal, the signal preferably includes the status of the smart security device 10. For example, in the first exemplary embodiment of the smart security device 10, when the cable 40 is immobilized in the cable passage 54 and the lock pin 80 is in the lock passage 58, the signal emitted by the tag 120 in the smart security device 10 preferably indicates that the smart security device 10 is electrically ready and also physically locked. Similarly, when the cable 40 is not in the cable passage 54 and the lock pin 80 is not in the lock passage 58, the signal emitted by the tag 120 should correspondingly indicate so.

Notably, each receiving transmitter 400 is configured to automatically receive signals emitted by any number of tags 120 provided in a corresponding number of smart security devices 10 when the receiving transmitter 400 is within the broadcast range of any of the smart security devices 10. In particular, no pairing between a receiving transmitter 400 and an emitting tag 120 is required in order for the receiving transmitter 400 to receive the signals emitted by the tag 120.

Figure 11:
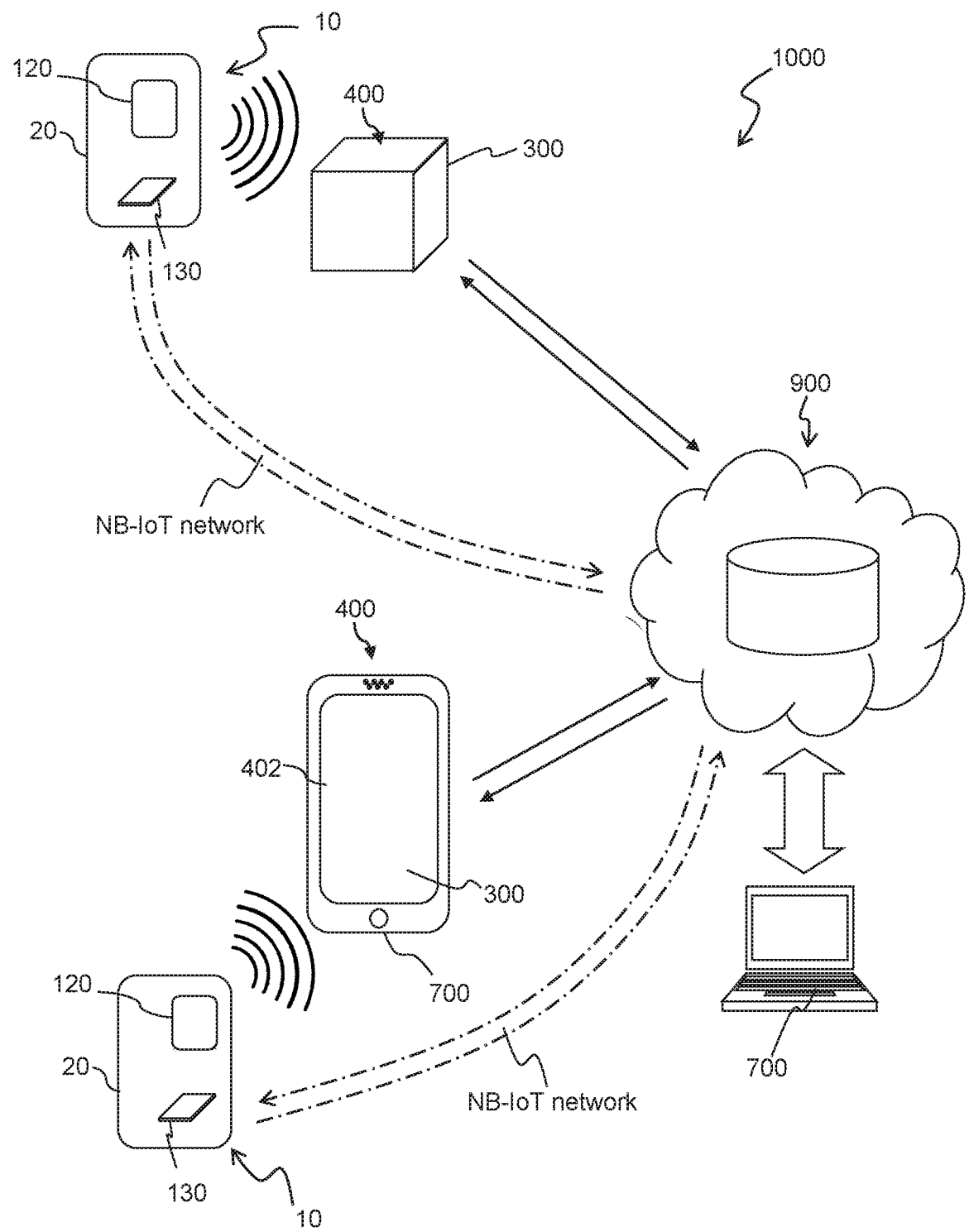
FIG. 11 is a schematic illustration of a second embodiment of a smart security system utilizing a number of a second embodiment of smart security devices for precise location tracking.
Figure 12:
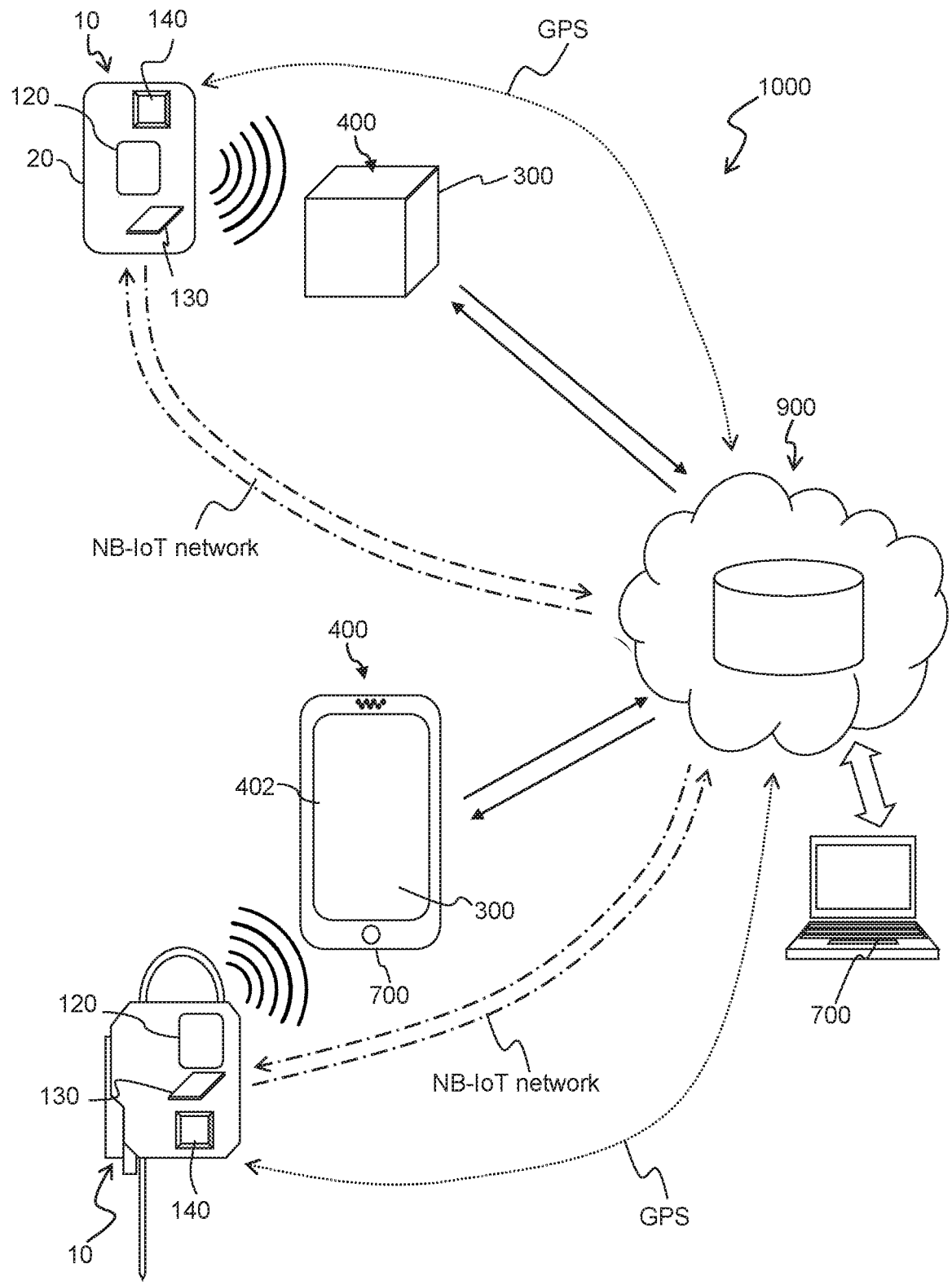
FIG. 12 is a schematic illustration of a third embodiment of a smart security system utilizing further embodiments of the smart security device for location and security tracking and remote locking.

In the smart security system 1000, a data system 900 is provided and configured to be wirelessly or remotely accessible to each of the receiving transmitters 400, as can be seen in FIGS. 7, 11 and 12. The data system 900 is configured to receive, process and store information that is transmitted in a signal generated by and sent from the number of receiving transmitters 400. Accordingly, the data system 900 comprises at least one server for executing tasks and a data store connected to the at least one server for data storage, so as to form a data communicating system with the number of receiving transmitters 400. For example, the data system 900 may comprise a cloud-based computing system, a web-based portal, a back-end server and the like. In the preferred embodiment, each of the number of receiving transmitters 400 is configured to transmit information to the data system 900 via Internet connectivity.

Information in the signal transmitted from the receiving transmitter 400 to the data system 900 comprises at least part of the information contained in the signal emitted by a tag 120 of smart security device 10 that has been received by the receiving transmitter 400 when the receiving transmitter 400 is within the broadcast range of the tag 120. Information in the signal transmitted from the receiving transmitter 400 to the data system 900 also further comprises information associated with the receiving transmitter 400 itself. In one embodiment where the receiving transmitters 400 comprise mobile phones, such information may comprise user identity and location information of each mobile phone 400 obtained by or transmitted to the data system 900 via known means, such as a global positioning system (GPS) functionality of each mobile phone 400, cell identities of a cellular network that each mobile phone 400 is operating within, WiFi networks and so on.

In embodiments where the receiving transmitter 400 is a stationary device, location of the receiving transmitter 400 would have been previously stored with the data system 900 so that this location can be associated with a tag 120 which signal has been received by the receiving transmitter 400.

Thus, when a specific receiving transmitter 400 that is within broadcast range of a particular tag 120 has received a first signal emitted by the particular tag 120, information in the first signal well as location information of the specific receiving transmitter 400 can be transmitted by the receiving transmitter 400 in a second signal to the data system 900, thereby allowing the particular tag 120 to be associated with the location of the specific receiving transmitter 400.

In one embodiment, the application 300 is configured to allow a user of the receiving transmitter 400 to activate transmission of the second signal from the receiving transmitter 400 to the data system 900 via a graphical user interface. In a preferred embodiment, the graphical user interface may be configured as a web portal. Alternatively or in addition, the application may be configured to automatically initiate transmission of the second signal to the data system 900 when the receiving transmitter 400 comes within the broadcast range of a tag 120 and receives the first signal from the tag 120. Where the application 300 is configured to allow both automatic as well as user-activated transmission of the second signal from the receiving transmitter 400 to the data system 900, the application 300 is preferably configured to allow a user to selectably set the application 300 to perform either automatic or user-activated transmission of the second signal from the receiving transmitter 400 to the data system 900.

As one receiving transmitter 400 may be within the broadcast range of a plurality of tags 120 in a corresponding plurality of smart security devices 10 and therefore receives a plurality of signals emitted by the plurality of tags 120, the application 300 may further be configured to allow a user to select which of the plurality of signals the user wishes the receiving transmitter 400 to obtain information from for onward transmission to the data system 40 in the second signal.

In another embodiment, where the application 300 is configured to automatically initiate transmission of the second signal from each of the number of receiving transmitters 400 to the data system 900, the second signal sent to the data system 900 would expectedly contain information obtained from the signals received from all the tags 120 that each receiving transmitter 400 is within the broadcast range of. Under such circumstances, where a particular tag 120 has, for example, two receiving transmitters 400 within its broadcast range, information from the particular tag 120 is sent to the data system 20 by both the two receiving transmitters 400. In order for the data system 900 to determine which receiving transmitter 400 is nearer the particular tag 120, a received signal strength indication (RSSI) may be determined by each receiving transmitter 400 for each signal emitted by a tag 120 that is received by each receiving transmitter 400. The RSSI may thus be also included in the second signal sent to the data system 900. In this way, the RSSI for a particular tag 120 which information was included in the second signals sent by two receiving transmitters 400 may be compared, so that the location of the receiving transmitter 400 that transmitted a higher RSSI may be selected as a closest estimate of the actual location of the particular tag 120.

Importantly, the unique identity of each smart security device 10 must have been previously associated with a specific asset to which each smart security device 10 is affixed, thereby creating an association database of unique device-and-item pairs. This association database is preferably stored and accessible in the data system 900, such that tracking a location of a particular tag 120 in a smart security device 10 is as good as and equivalent to tracking a location of the specific asset affixed with that particular smart security device 10.

In addition, the data system 900 is preferably configured to allow one or more users using a client machine 60 in data communication with the data system 900 to query a status of an asset that has been secured with a smart security device 10, in order to determine a last known location of the asset, the last known location being indicated by a last one of the number of receiving transmitters 400 to have come within the broadcast range of the tag 120 in the smart security device 10. Besides storing and providing the last known location of an asset secured with a smart security device 10, the data system 900 is preferably also configured to store and to allow a user to view on the client machine 700 a movement history of the asset as previously registered by other receiving transmitters 400 sequentially prior to and leading up to the last known location of the asset. Notably, any one of the receiving transmitters 400 may be further configured to function as a client machine 700 in data communication with the data system 900.

In addition to the application 300 being configured for managing information obtained from a signal received from a tag 120, the application 300 is preferably also configured to allow authorized users to operate the smart security device 10. Accordingly, data in the signals emitted by the tag 120 is preferably encrypted so that only authorized users are able to communicate with and operate the smart security device 10.

In one example of operation, when the smart security device 10 is electrically ready (in the first exemplary embodiment, the cable 40 is immobilized in the cable passage 54), the application 300 can be configured to allow an authorized user to turn on an electronic lock of the smart security device 10 via the electronics in the device 10. When the electronic lock is on, preferably, the signal emitted by the tag 120 should indicate so. The electronic lock is preferably configured to be unlockable only by an authorized user having a receiving transmitter 400 installed with the application 300 that has been set up to be able to unlock the electronic lock. In this way, the smart security device 10 provides an additional layer of security of the asset via the electronic lock.

In addition to location of the smart security device 10, the application 300 may be configured to identify a user of the application 300 such that when an asset has been secured with the smart security device 10, using the receiving transmitters 400 and data system 900 described above, authorized parties are able to determine the asset's status (e.g. physical lock on or off, electronic lock on or off), location, as well as the identity of the party presently holding the asset in custody or within the broadcast range of the smart security device 10 associated with the asset. This allows handing over of the asset from one registered party to another to be recorded in the data system 900 when the various parties acknowledge handing over and proof of delivery of the asset accordingly. Furthermore, as the smart security device 10 may also be configured to emit a corresponding signal when it has been unlocked, whether physically or electronically, information such as date, time and identity of the unlocking location (and accordingly the party with which the asset is in present custody or within broadcast range of the security device) may also be similarly recorded.

The smart security device 10 further comprises a NB-IoT module 130 configured to be wirelessly or remotely accessible to the data system 900 of the smart security system 1000 as shown in FIGS. 7, 11 and 12. The data system 900 and the NB-IoT module 130 are configured to communicate with each other using a Narrowband IoT (NB-IoT) network, a technology standardized by 3rd Generation Partnership Project (3GPP) which is a standards body that unites several telecommunications standard development organizations globally.

NB-IoT is a known narrowband radio technology developed to allow for Internet of Things in which physical devices may be inter-networked to enable collection and exchange of data. NB-IoT may be provided in a number of ways, for example via unused 200-KHz bands that have previously been used for GSM, on LTE base stations that can allocate a resource block to NB-IoT operations or in their guard bands, or independently. In a NB-IoT network, one cell of an existing cellular network may be configured to support many devices: for example, a single existing 3G or 4G base station may be upgraded to support up to about 100,000 devices. NB-IoT also has deep penetration for improved coverage indoors and underground, thus providing low power wide area (LPWA) coverage to allow internetworking of multiple devices.

In the smart security device 10, the NB-IoT module 130 is readily provided at relatively low cost, and uses low power when operating NB-IoT to receive or transmit signals, giving up to ten years of battery life depending on actual usage. The NB-IoT module 130 may be configured to periodically send signals to the data system 900, thereby directly communicating with the data system 900 without going through the receiving transmitter 400.

As the smart security system 1000 is configurable to perform one or both automatic as well as user-activated transmission of information from one or more receiving transmitters 400 to the data system 900 when the one or more receiving transmitters 400 are within the broadcast range of any number of tags 120, the smart security system 1000 can appreciably be variously and appropriately configured to suit multiple different fields of use in the security industry, as will be described in greater detail below.

Optionally, for all embodiments, the smart security device 10 may further include a GPS module 140 configured to determine its location via a Global Navigation Satellite System receive GPS signals via a Global Navigation Satellite System and calculate coordinates, and also transmit its present location coordinates to the data system 900, as shown in FIG. 12. In this way, the smart security system 1000 can use GPS as an alternative to the tags 120 and receiving transmitters 400 in order for the data system 900 to directly track location of the security device 10. By providing GPS capability in the smart security device 10 and system 1000 together with NB-IoT networking and BLE functionality, the smart security device 10 and system 1000 are able to be used for all kinds of security applications, while ensuring that loss of location tracking is minimized, for example when no receiving transmitter 400 having GPS functionality is within broadcast range of the tag 120 in order to transmit location information of the tag 120.

The smart security device 10 and system 100 may thus be configured to provide two alternative modes of location tracking: a first mode comprising the tag 120 in the smart security device being read by a receiving transmitter 400 having GPS capability to pinpoint its location, and a second mode comprising the GPS module 140 directly providing location of the smart security device 10. The smart security device 10 and system 100 may also provide two alternative modes of transmitting information to the data system 900: a first mode comprising the receiving transmitter(s) 400 communicating with the data system 900 using WiFi Internet connection or a cellular network connection, the second mode comprising the NB-IoT module 130 communicating with the data system 900 via the NB-IoT network. It should be noted that information transmitted via the NB-IoT network may also comprise location information provided by the GPS module 140 in the smart security device 10.

Remote Locking

When using the smart security device 10 and system 1000 for remote locking of an asset, the signals received by the NB-IoT module 130 from the data system 900 may be used to remotely trigger locking of the smart security device 10 and prevent removal of the smart security device 10 from an asset physically locked with the smart security device 10, as well as to remotely allow the smart security device 10 to be removed from the asset.

To that end, the smart security device 10 may further comprise a remotely actuated lock 98 configured to be remotely activated to prevent physical unlocking of the smart security device 10 and remotely deactivated to allow unlocking of the smart security device 10 using signals received by the NB-IoT module 130. When activated by a first signal received by the NB-IoT module 130, the activated remotely actuated lock 98 prevents the smart security device 10 from being physically unlocked and removed from the asset without breaking the smart security device 10. When deactivated by a second signal received by the NB-IoT module 130, the deactivated remotely actuated lock 98 allows the smart security device 10 to be physically unlocked and removed from the asset by an authorized person.

The remotely actuated lock 98 may be provided in the smart security device 10 in a number of ways. In the first exemplary embodiment of the smart security device 10 described above, where a remotely actuated lock 98 is provided, the remotely actuated lock 98 may comprise a securing pin 92 configured to be passed through the lever 70 into a securing hole 96 provided in the lock pin 80 when the securing pin 92 is in an activated position (as shown in FIG. 4B), in which the lock pin 80 is immobilized relative to the lever 70, thereby preventing the lock pin 80 from being removed from the lock passage 58, and accordingly disallowing removal of the smart security device 10 from the asset. When the securing pin is in a deactivated position (as shown in FIG. 4A), the securing pin 92 is withdrawn from lock pin 80, thereby allowing movement of the lock pin 80 relative to the lever 70, so as to allow the lock pin 80 to be removed from the lock passage 58 in order to move the lever 70 away from the body 50 and release pressure of the resilient plate 76 against the cable immobilizer 60, thereby allowing the cable 40 to be withdrawn from the cable passage 54, and accordingly allowing removal of the smart security device 10 from the asset.

The remotely actuated lock 98 of the first exemplary embodiment also comprises a motorized actuator 94 configured to move the securing pin 92 between the activated position and the deactivated position. Operation of the motorized actuator 94 is configured to be triggered by a signal received by the NB-IoT module 130 via the NB-IoT network, as shown in FIG. 7. In this way, for a user to physically remove the smart security device 10 from the asset, the smart security device 10 must first be in an allowed state in which the securing pin 92 has been moved to the deactivated position (upon receiving an appropriate narrow band signal). Only then can the user remove the lock pin 80 from the lock passage 58 and go on to remove the cable 40 from the cable passage 54.

Conversely, after the smart security device 10 has been physically locked to the asset by the user performing the steps of inserting the cable 40 into the cable passage 54, immobilizing the cable 40 with the cable immobilizer 60 by pressing the lever 70 towards the body 50, followed by inserting the lock pin 80 into the lock passage 58, closure of the lock circuit is communicated to the electronics via the electrical contacts provided in the lock passage 58 (as described above), and may trigger the NB-IoT module 130 to send a narrow band signal to the data system 900 to indicate that the smart security device 10 is now in a physically locked state. Upon receiving the narrow band signal from the NB-IoT module 130 communicating that it is in the physically locked state, the data system 900 may be configured to accordingly send a narrow band signal back to the NB-IoT module 130 via the NB-IoT network to trigger the motorized actuator 94 to move the securing pin 92 to the activated position, thereby disallowing physical removal of the smart security device 10 form the asset without destruction of the smart security device 10. In this way, the smart security device 10 can be said to be remotely locked after physically securing it to the asset.

Although it is depicted in FIGS. 4A and 4B that the motorized actuator 94 is provided on the outside of the lever 70 relative to the housing 20, in other embodiments, the motorized actuator 94 may be provided within the housing 20 so as not to be visible externally. Furthermore, the securing hole 96 provided in the lock pin 80 may be in other orientations besides the orientation shown in FIGS. 4A and 4B. For example, the securing hole 96 may be parallel with the cable tie hole 39. In all cases, it will be understood that the securing pin 92 and motorized actuator 94 would be provided oriented according to the orientation of the securing hole 96 in the lock pin 80 in order for the remotely actuated lock 98 to function.

By configuring the smart security device 10 to include the NB-IoT module 130 and remotely actuated lock 98, a further layer of security is thereby provided by the smart security device 10 and system 1000, so that in addition to physically securing the asset with the smart security device 10 and establishing an electronic lock via the BLE signal, a further remote locking can be applied via the NB-IoT connection to prevent physical unlocking and removal of the smart security device 10 even by a user authorized to use the BLE signal to unlock the electronic lock. In use, the data system 900 can be configured to automatically activate or deactivate the remotely actuated lock 98 when a predetermined condition is met, such as when a specific status of the smart security device 10 is noted (e.g. locked or unlocked) or arrival of the smart security device 10 at a specific location, as will be described in greater detail below.

Remote Locking Example 1: Securing Access Door

One envisaged use of a smart security device 10 and system 1000 configured for remote locking is in the securing of access doors to common property such as water tanks on the roof of buildings. For example, an estate management company may be in charge of maintaining a sizeable number of buildings. Each building may have one or more access doors to the roof where one or more water tanks are located. Each of the access doors may be secured with one smart security device 10 so that each access door can only be opened after removal of the smart security device 10. The estate management company may subcontract water tank maintenance to a subcontractor. To maintain each water tank, a maintenance worker from the subcontractor may be provided with the application 300 installed in a receiving transmitter 400 carried about by the maintenance worker, such as his smart phone. When the maintenance worker is within broadcast range of the tag 120 of the smart security device 10, the application 300 receives the Bluetooth signal from the tag 120 and the receiving transmitter 400 transmits a to the data system 900 to verify that the maintenance worker is indeed authorized to service the water tank that day, according to a predetermined maintenance schedule. Upon verification, the data system 900 sends a narrow band signal to the NB-IoT module 130 of the smart security device 10 to deactivate the remotely actuated lock 98. Using the exemplary embodiment of the smart security device 10 configured for remote locking, this will trigger the motorized actuator 94 to move the securing pin 92 to the deactivated position. In the deactivated position, the maintenance worker is now able to manually remove the lock pin 80 from the lock passage 58, and proceed to remove the smart security device 10 from the access door in order to open the door and gain access to the water tank for maintenance.

After maintenance has been completed, the maintenance worker manually physically secures the smart security device 10 to the access door to prevent opening of the access door, thereby also triggering the NB-IoT module 130 to send a narrow band signal to the data system 900 to indicate that the smart security device 10 is now in a physically locked state. Such information can be considered by the data system 900 as a predetermined condition being met in order for the data system 900 to automatically send a narrow band signal back to the NB-IoT module 130 via the NB-IoT network to activate the remotely actuated lock 98. This will trigger the motorized actuator 94 to move the securing pin 92 to the activated position, thereby remotely locking the smart security device 10 and preventing its removal from the access door without breaking the smart security device 10.

The smart security device 10 may also send a narrow band signal to the data system 900 to indicate that the smart security device 10 is physically not locked if the maintenance worker fails to manually physically lock the smart security device 10 to the access door after a predetermined time period has passed. Such information can be considered by the data system 900 as a predetermined condition being met in order for the data system 900 to automatically trigger an alert to the estate management company that an access door has been left open against regulations. Corrective action may then be taken, and the subcontractor company may be penalized for not failing to lock the access door with the smart security device 10 after maintenance of the water tank.

Remote Locking Example 2: Securing Tanker Vessel

In another envisaged use of the smart security device 10 and system 1000 configured for remote locking is to track location of a tanker vessel and its fluid cargo. For example, access to each cargo tank of the tanker vessel may be secured by one set of the smart security device 10. Only an authorized person having a receiving transmitter 400 installed with the application 300 to authenticate the Bluetooth signal emitted by the tag 120 of the smart security device 10 would be allowed to remove the smart security device 10 and unlock the access to the cargo tank for removal of the cargo stored in the cargo tank.

Additionally, the NB-IoT module 130 of the smart security device 10 may be configured to periodically send a signal to the data system 900 (e.g. once a day) to communicate the location of the tanker vessel to the data system 900. The location of the tanker vessel may be determined by a GPS module 140 provided in the smart security device 10, as described above. When the tanker vessel is not at an authorized location, the smart security device 10 may be always kept locked by keeping the remotely actuated lock 98 activated. This prevents even authorized persons from removing the smart security device 10 from the access to the cargo tank when the tanker vessel is not at an expected destination for offloading the cargo, thereby preventing theft of the cargo during transit or at an unauthorized port.

The remotely actuated lock 98 is deactivated only when the tanker vessel has reached its expected destination, to allow the authorized person to remove the smart security device 10 and unlock the access to the cargo tank for offloading the cargo tank at the expected destination. Confirmation of arrival of the tanker vessel at the expected destination can be considered by the data system 900 as a predetermined condition being met in order for the data system 900 to automatically deactivate the remotely actuated lock 98.

Should there be forceful breakage of the smart security device 10 to gain unauthorized access to the cargo tank, the NB-IoT 130 module of the smart security device 10 may be configured to send a signal to the data system 900 to trigger an alert or alarm that security has been breached.

Precise Location Tracking of Assets

When using the smart security device 10 and system 1000 for precise location tracking of assets, it is typically expected that each asset is often moved about, such as individual animals, pieces of portable medical equipment in hospitals such as bedside monitors and anaesthetic machines or even human patients, and office assets such as computers and peripheral devices, for example. Each asset is physically locked with a set of the smart security device 10, i.e., the smart security device 10 is physically attached to the asset.

In this example, a number of receiving transmitters 400 installed with the application 300 that is configured for automatic receiving of BLE signals from the smart security device 10 and automatic transmission of information to the data system 900 are provided at key locations throughout the facility where each asset may be expected to be found. In addition, the application 300 may also be installed in the personal mobile phones 400 of persons working with the assets, such as a livestock handler, a nurse or medical orderly.

In this way, wherever the broadcast range of an asset secured with the smart security device 10 reaches a specific one of the number of receiving transmitters 400 that are provided about the facility, the application 300 in that specific receiving transmitter 400 automatically receives and transmits information of the tag 120 as well as location of the specific receiving transmitter 400 to the data system 900 to record the location of the asset.

In addition, where the receiving transmitters 400 that have been provided at the key locations are not within the broadcast range of a particular asset secured with the smart security device 10, location of the particular asset may still be determined simply by a person working with the particular asset receiving its emitted signal with their mobile phone 400 that has been installed with the application 30, and transmitting this information together with the location of their mobile phone 400 to the data system 900. In the mobile phones 400 of the persons who work with the particular asset, the application 300 can be configured to be selectable to either automatically or user-activatedly transmit information to the data system 900. In this way, the application 300 can be customized to specifically suit the needs of the users of the smart security system 1000.

Besides location tracking of the asset within a facility using the BLE signal from the smart security device 10, location of the asset outside the facility may also be tracked using the GPS module 140 and/or the NB-IoT connection between the NB-IoT module 130 of the smart security device 10 and the data system 900. In this way, using the smart security device 10 and system 1000, precise location of the asset may be known by tracking the general location of an asset (e.g. a street address or location as may be indicated on a geographical map) using the GPS module and/or narrow band signals, and tracking location of the asset within a facility (e.g. on which floor of the building and in which room) using BLE signals.

In some applications, precise location tracking of an asset may be coupled together with remote locking of the asset as earlier described above. For example, in the delivery of important packages, a package may be physically locked by a smart security device 10 with its remotely actuated lock 98 activated during transit of the package to prevent physical removal of the smart security device 10 from the package, until it is confirmed that the package has been delivered to its intended destination which may be a particular unit in a building having many separate units. This would require locating the package at the particular building (as can be determined using the NB-IoT functionality with GPS) and also locating the package at the specific unit (i.e. floor and suite) within the building (as can be determined using the BLE functionality). Confirmation of delivery can be considered a predetermined condition being met in order for the data system 900 to remotely deactivate the remotely actuated lock 98 to allow physical removal of the smart security device 10 for access to the package.

In other applications, it may be desired to perform only precise location tracking without requiring remote locking, such as for the safety of persons or animals to know their whereabouts. To that end, a second exemplary embodiment of the smart security device 10 as shown in FIG. 11 may be configured in which the housing 20 comprises a simple light-weight casing (preferably waterproof) enclosing the tag 120, the NB-IoT module 130 and associated electronics. The housing 20 may be configured to be attached to the person or animal via known means such as a wristband or collar. Appreciably, this configuration may be extended to the precise location tracking of packages that do not require remote locking but still need confirmation of delivery at a final destination within a building, by simply slipping the second exemplary embodiment of the smart security device 10 within the package. In some embodiments, the simple light-weight casing 20 may further enclose a GPS module 140 to allow tracking of the smart security device 10 via GPS, as shown in FIG. 12.

With the smart security device 10 and system 1000 as described above, users can be protected from losses such as loss of revenue arising from missing, stolen or misplaced cargo, or loss of a vehicle or other valuable asset. Cost of administration and transportation can be reduced by replacing high-cost human security escorts with the low-cost smart security device 10 and that allows precise location and status of a secured asset to be continually tracked during movement, such as along its entire chain of custody, including during storage, while further security may be provided using the embodiment of the smart security device 10 and system 1000 configured to perform remote locking, thereby preventing actual physical removal of the smart security device 10 from the asset. Cargo movement can be sped up with the minimizing of manual security interventions by use of the smart security device 10, thereby also raising user confidence levels in the integrity of the various conveyances involved.

Whilst there has been described in the foregoing description exemplary embodiments of the present invention, it will be understood by those skilled in the technology concerned that many variations in details of design, construction and/or operation may be made without departing from the present invention. For example, while the fastener of the lock assembly has been described as comprising a lock passage in the body of the lock assembly and a lock pin provided on the lever of the lock assembly, other suitable configurations of the fastener 88 may be devised to secure the lever to the body when the cable has been immobilized in the cable passage. While the cable immobilizer has been described and depicted as a pin held in a pin passage in the body of the lock assembly, the cable immobilizer may have other configurations. For example, the cable immobilizer may alternatively be attached to the resilient plate provided on the lever, and configured to contact the cable when the lever is brought into contact with the body, e.g., as a boss protruding from the resilient plate.

The invention claimed is:

1. A smart security device comprising:
   a housing, and
   electronics provided in the housing, the electronics comprising
     a tag uniquely associated with the smart security device and configured to automatically and periodically emit a first signal, the first signal being a Bluetooth signal configured to be sent and received via a Bluetooth low energy wireless personal area network;
     a NB-IoT module configured to send and receive signals via a NB-IoT network;
   a cable having a free end and a secured end, the secured end being secured to the housing and in electrical connection with the electronics; and
   a lock assembly at least partially provided in the housing, the lock assembly comprising:
     a body comprising a cable passage configured for passing the free end of the cable therethrough and for immobilizing the cable therein,
     a lever having a free end and a pivoting end, the pivoting end pivotably connected to the body, the lever having a resilient plate provided thereon, the resilient plate configured to exert a force on a cable immobilizer against the cable to immobilize the cable in the cable passage when a side of the lever facing the body is brought into contact with a side of the body facing the lever while the cable is in the cable passage, and
     a fastener configured to secure the lever to the body when the cable is immobilized in the cable passage.

2. The smart security device of claim 1, wherein the electronics further comprises a Global Positioning System (GPS) module for location tracking of the smart security device via GPS.

3. The smart security device of claim 1, wherein the smart security device further comprises a remotely actuated lock configured to be remotely activated to prevent physical unlocking of the smart security device and remotely deactivated to allow physical unlocking of the smart security device using the signals received by the NB-IoT module.

4. The smart security device of claim 3, wherein the fastener comprises a lock passage provided in the body and a lock pin provided on the lever, the lock passage configured to receive the lock pin therein, and wherein the remotely actuated lock comprises a securing pin configured to pass through the lever into a securing hole provided in the lock pin in an activated position, the securing pin configured to be withdrawn from the securing hole in a deactivated position.

5. The smart security device of claim 4, wherein the remotely actuated lock further comprises a motorized actuator configured to move the securing pin between the activated position and the deactivated position, wherein operation of the motorized actuator is configured to be triggered by a signal received by the NB-IoT module.

6. The smart security device of claim 3, wherein the remotely actuated lock is provided within the housing and externally invisible.

7. A smart security system comprising:
   the smart security device of claim 1, wherein the security device further comprises:
     a cable having a free end and a secured end, the secured end being secured to the housing and in electrical connection with the electronics;
     a lock assembly at least partially provided in the housing, the lock assembly comprising:
       a body comprising a cable passage configured for passing the free end of the cable therethrough and for immobilizing the cable therein,
       a lever having a free end and a pivoting end, the pivoting end pivotably connected to the body, the lever having a resilient plate provided thereon, the resilient plate configured to exert a force on a cable immobilizer against the cable to immobilize the cable in the cable passage when a side of the lever facing the body is brought into contact with a side of the body facing the lever while the cable is in the cable passage, and
       a fastener configured to secure the lever to the body when the cable is immobilized in the cable passage; and
     a remotely actuated lock configured to be remotely activated to prevent physical unlocking of the smart security device and remotely deactivated to allow physical unlocking of the smart security device using the signals received by the NB-IoT module;
   a receiving transmitter having a Bluetooth signal reception functionality, the receiving transmitter configured to automatically receive the first signal from the tag when the receiving transmitter is within a broadcast range of the tag without requiring pairing of the receiving transmitter and the tag, the receiving transmitter further configured to transmit a second signal;
   a data system configured to be remotely accessible to the receiving transmitter and to receive the second signal transmitted from the receiving transmitter, the data system comprising at least one server for executing tasks and a data store connected to the at least one server for data storage, the second signal being transmitted via a network to which the receiving transmitter is connected, the network being at least one of a cellular mobile network and a wireless network, the data system further configured to remotely communicate with the NB-IoT module via the NB-IoT network; and
   an application configured to be installed in the receiving transmitter, the application configured to allow the receiving transmitter to automatically receive the first signal and to initiate transmission of the second signal from the receiving transmitter to the data system.

8. The smart security system of claim 7, wherein the first signal comprises information associated with the smart security device, and wherein the second signal comprises information associated with the receiving transmitter and at least part of the information associated with the smart security device.

9. The smart security system of claim 8, wherein the information associated with the receiving transmitter includes ownership and location information of the receiving transmitter, and wherein the information associated with the smart security device includes information identifying the item to which the smart security device is attached and status of the smart security device.

10. The smart security system of claim 9, wherein status of the smart security device comprises at least one of:

whether the smart security device is electronically locked and whether the smart security device is physically locked.

11. The smart security system of claim 7, comprising a plurality of the receiving transmitter provided at various locations, and wherein the second signal transmitted from each of the plurality of the receiving transmitter provides a record of movement of the item to which the smart security device is attached and a record of status of the smart security device, the movement being from an authorized sender to an authorized recipient through the various locations.

12. The smart security system of claim 11, wherein the second signal from one of the plurality of the receiving transmitter that is located at a location of the authorized recipient includes an electronic proof of delivery when the authorized recipient receives the item.

13. The smart security system of claim 7, wherein the application is configured to initiate transmission of the second signal from the receiving transmitter to the data system via at least one of: automatic transmission and user-activated transmission.

14. The smart security system of claim 13, wherein the application is configured to allow a user to select one of: automatic transmission and user-activated transmission to initiate transmission of the second signal from the receiving transmitter to the data system.

15. The smart security system of claim 7, comprising a plurality of the smart security device, the receiving transmitter being provided at a location where a number of items are stored, each of the number of items having one of the plurality of the smart security device attached thereto that is registered with the data system to indicate that the number of items are expected to be at the location, wherein the application installed in the receiving transmitter is configured to match received signals from each of the smart security devices at the location with expected presence of the registered smart security devices and to transmit an alert to the data system if a signal expected to be received from any one of the registered smart security devices is not received by the receiving transmitter within a specified time frame.

16. The smart security system of claim 7 wherein the data system is configured to automatically activate or deactivate the remotely actuated lock when a predetermined condition is met.

17. The smart security system of claim 7, wherein the NB-IoT module is configured to periodically transmit a signal to the data system.

\* \* \* \* \*